(12) United States Patent
Foster et al.

(10) Patent No.: US 11,178,804 B2
(45) Date of Patent: Nov. 23, 2021

(54) GROUND ENGAGING TOOL POSITIONING SYSTEM

(71) Applicant: CNH Industrial America LLC, New Holland, PA (US)

(72) Inventors: Christopher Alan Foster, Mohnton, PA (US); Scott Andrew Elkins, Plainfield, IL (US); John Henry Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 248 days.

(21) Appl. No.: 16/430,784

(22) Filed: Jun. 4, 2019

(65) Prior Publication Data

US 2020/0383260 A1 Dec. 10, 2020

(51) Int. Cl.
*A01B 63/16* (2006.01)
*A01B 69/00* (2006.01)
*B62D 6/00* (2006.01)

(52) U.S. Cl.
CPC ............ *A01B 63/16* (2013.01); *A01B 69/007* (2013.01); *B62D 6/002* (2013.01)

(58) Field of Classification Search
CPC ...... A01B 63/16; A01B 69/007; B62D 6/002; B60G 17/0162; B60G 2300/08; B60G 2300/30
See application file for complete search history.

(56) References Cited

U.S. PATENT DOCUMENTS

| | | | |
|---|---|---|---|
| 5,190,111 A | 3/1993 | Young et al. | |
| 6,144,910 A | 11/2000 | Scarlett et al. | |
| 6,434,462 B1 | 8/2002 | Bevly et al. | |
| 6,681,551 B1 | 1/2004 | Sheidler et al. | |
| 6,804,597 B1 | 10/2004 | Posselius et al. | |
| 6,907,336 B2 | 6/2005 | Gray et al. | |
| 7,162,348 B2 | 1/2007 | McClure et al. | |
| 7,739,015 B2 | 6/2010 | Senneff et al. | |
| 7,860,628 B2 | 12/2010 | Lange | |
| 8,577,558 B2 | 11/2013 | Mitchell | |
| 8,635,011 B2 | 1/2014 | Senneff et al. | |
| 8,942,893 B2 * | 1/2015 | Rosa | G05D 3/12 701/50 |
| 8,983,767 B2 | 3/2015 | Pieper et al. | |
| 9,526,199 B2 | 12/2016 | Matsuzaki et al. | |

(Continued)

FOREIGN PATENT DOCUMENTS

JP   2006006167   1/2006

OTHER PUBLICATIONS

John Deere, ITEC™ Pro, https://www.deere.com/en/technology-products/precision-ag-technology/guidance/itec-pro/, 15 pgs, May 21, 2019.

*Primary Examiner* — Russell Frejd
(74) *Attorney, Agent, or Firm* — Rickard K. DeMille; Rebecca L. Henkel

(57) ABSTRACT

An agricultural system includes a controller having a memory and a processor. The controller is configured to determine a steering angle of a work vehicle of the agricultural system, determine a target height of a ground engaging tool of the agricultural system based on the steering angle, and output a signal to control a height of the ground engaging tool relative to a soil surface based on the target height.

14 Claims, 5 Drawing Sheets

(56) References Cited

U.S. PATENT DOCUMENTS

| | | | |
|---|---|---|---|
| 2012/0261146 A1* | 10/2012 | Bolten | A01B 69/004 172/1 |
| 2014/0190711 A1* | 7/2014 | Horsch | A01B 73/048 172/1 |
| 2014/0343800 A1* | 11/2014 | Nelson | E02F 3/845 701/49 |
| 2017/0188505 A1 | 7/2017 | Potier et al. | |
| 2017/0202131 A1 | 7/2017 | Bunderson et al. | |
| 2017/0318735 A1 | 11/2017 | Foster et al. | |
| 2017/0339822 A1* | 11/2017 | Gresch | A01B 69/008 |
| 2017/0354079 A1 | 12/2017 | Foster et al. | |

* cited by examiner

GROUND ENGAGING TOOL POSITIONING SYSTEM

BACKGROUND

The present disclosure relates generally to an agricultural system and, more specifically, to controlling a position of a ground engaging tool of an implement of the agricultural system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Agricultural tilling implements are used to cultivate soil. These implements may include ground engaging tools that are configured to engage the soil. For example, the implement may be towed through a field to break up clods or lumps of soil during operation of the implement to provide a more amenable soil structure for planting and/or to level the soil surface. Certain implements may be towed by a work vehicle such that the implement moves with the work vehicle through the field. The work vehicle may turn (e.g., at a headland), thereby causing the implement to turn as well. During the turn, the position of the implement may undesirably affect a performance of the implement to engage the soil. For example, one of the ground engaging tools of the implement may be raised too early in anticipation of the turn, and may be at a position that is tills the soil less effectively while the implement is turning.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an agricultural system includes a controller having a memory and a processor. The controller is configured to determine a steering angle of a work vehicle of the agricultural system, determine a target height of a ground engaging tool of the agricultural system based on the steering angle, and output a signal to control a height of the ground engaging tool relative to a soil surface based on the target height.

DRAWINGS

These and other features, aspects, and advantages of the present disclosure will become better understood when the following detailed description is read with reference to the accompanying drawings in which like characters represent like parts throughout the drawings, wherein.

Figure 5:
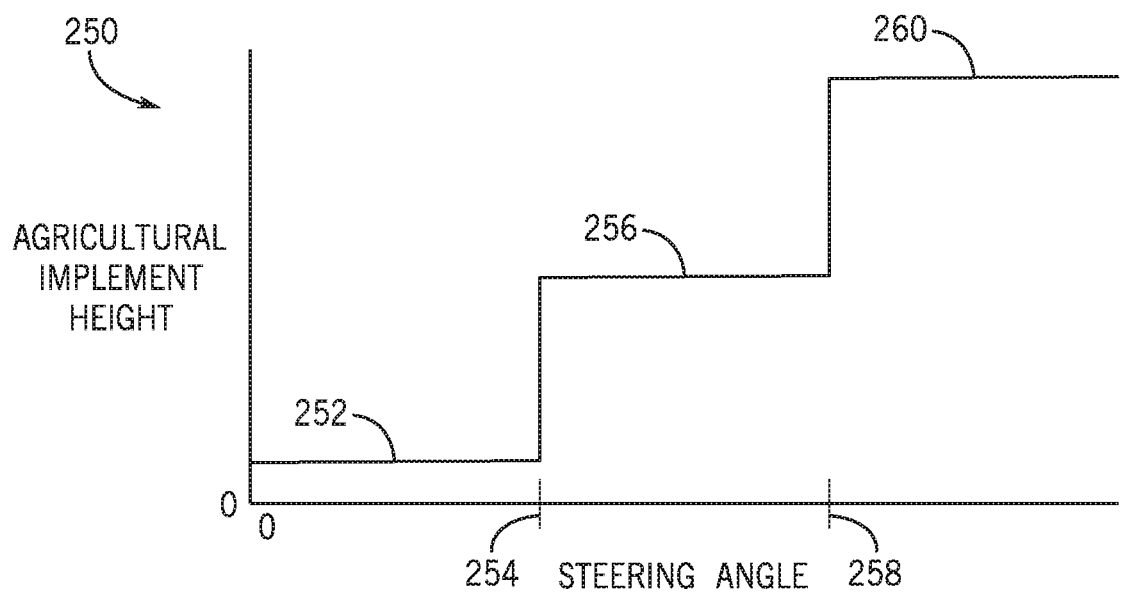
Figure 6:
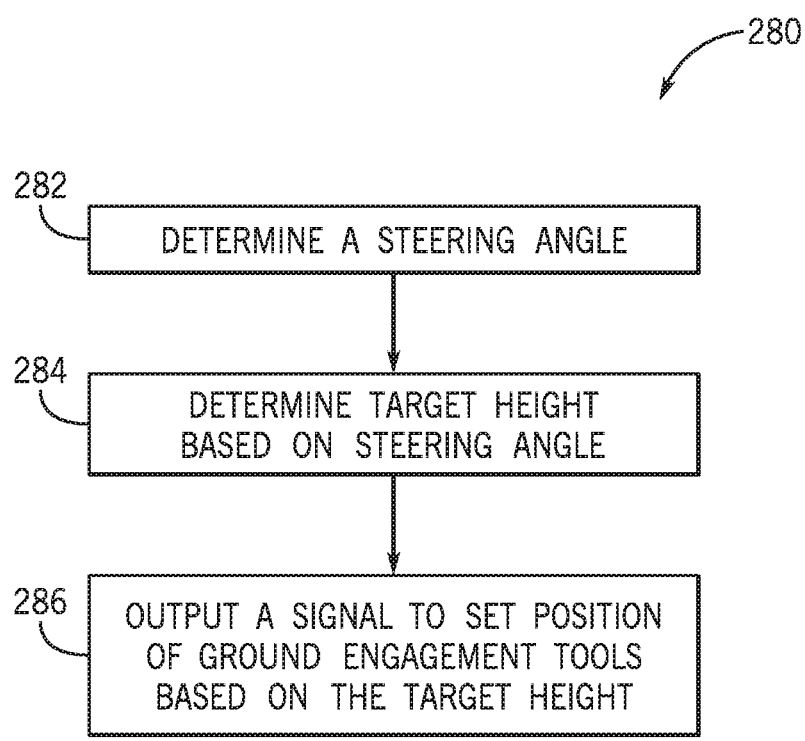

FIG. 5 is a graph of an embodiment of a steering profile that may be employed by the agricultural system to control the position of ground engaging tools the agricultural implement based on a steering angle, in accordance with an aspect of the present disclosure; and FIG. 6 is a flowchart of an embodiment of a method for controlling the position of ground engaging tools of the agricultural implement based on the steering angle, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural system having an agricultural implement configured to perform an agricultural operation within a field. For example, the agricultural system may include an agricultural tilling implement that may be operated to break up soil within the field to cultivate the field. The agricultural system may also include a work vehicle, such as a tractor, that may tow the agricultural implement through the field. To break up the soil, the agricultural implement may be positioned such that a ground engaging tool of the agricultural implement, such as a blade, a disc, a shank, or any combination thereof, is disposed within the ground to engage the soil. For instance, a height of a frame or subframe of the agricultural implement may be raised and/or lowered, and/or a height of the ground engaging tool may be directly moved relative to the soil. The work vehicle may then tow the agricultural implement through the field while the ground engaging tool engages the soil to till the field.

During operation of the agricultural system, the work vehicle may turn, thereby causing the agricultural implement to turn. In some circumstances, the ground engaging tool remains inserted into the soil while the agricultural implement turns. Thus, the ground engaging tool may be rotated within the soil as the agricultural implement is turning. As the ground engaging tool rotates within the soil, the soil may impart a force onto the ground engaging tool, and may cause undesirable wear and/or impart unwanted forces on the ground engaging tool. In another example, the agricultural implement may be adjusted to lift the ground engaging tool above the soil. However, raising the ground engaging tool at an undesired time (e.g., too early in anticipation of the turn) may result in an incomplete tilling operation, such as not effectively tilling part of the field.

Accordingly, effectively controlling the position of the ground engaging tool relative to a soil surface may increase the longevity of the ground engaging tool and/or enhance the effectiveness of the tilling operation. In the embodiments disclosed herein, the position of the ground engaging tool may be adjusted relative to the soil based on a steering angle of the agricultural system. For example, at a greater steering angle, the ground engaging tool may be raised to reduce an amount (e.g., surface area, volume) of the ground engaging tool that is inserted into the soil. As such, the force imparted on the ground engaging tool during the turn of the agricultural implement may be reduced and the longevity of the ground engaging tool may be increased. Moreover, the position of the ground engaging tool may enable the ground engaging tool to remain at least partially inserted into the soil. Therefore, during the turn, the ground engaging tool may at least partially till the soil. Although this disclosure primarily discusses the use of an agricultural tilling implement in the agricultural system, it should be noted that the features mentioned in this disclosure may be applied to any other suitable agricultural implement having ground engaging tools (e.g., planter, seeder).

Figure 1:
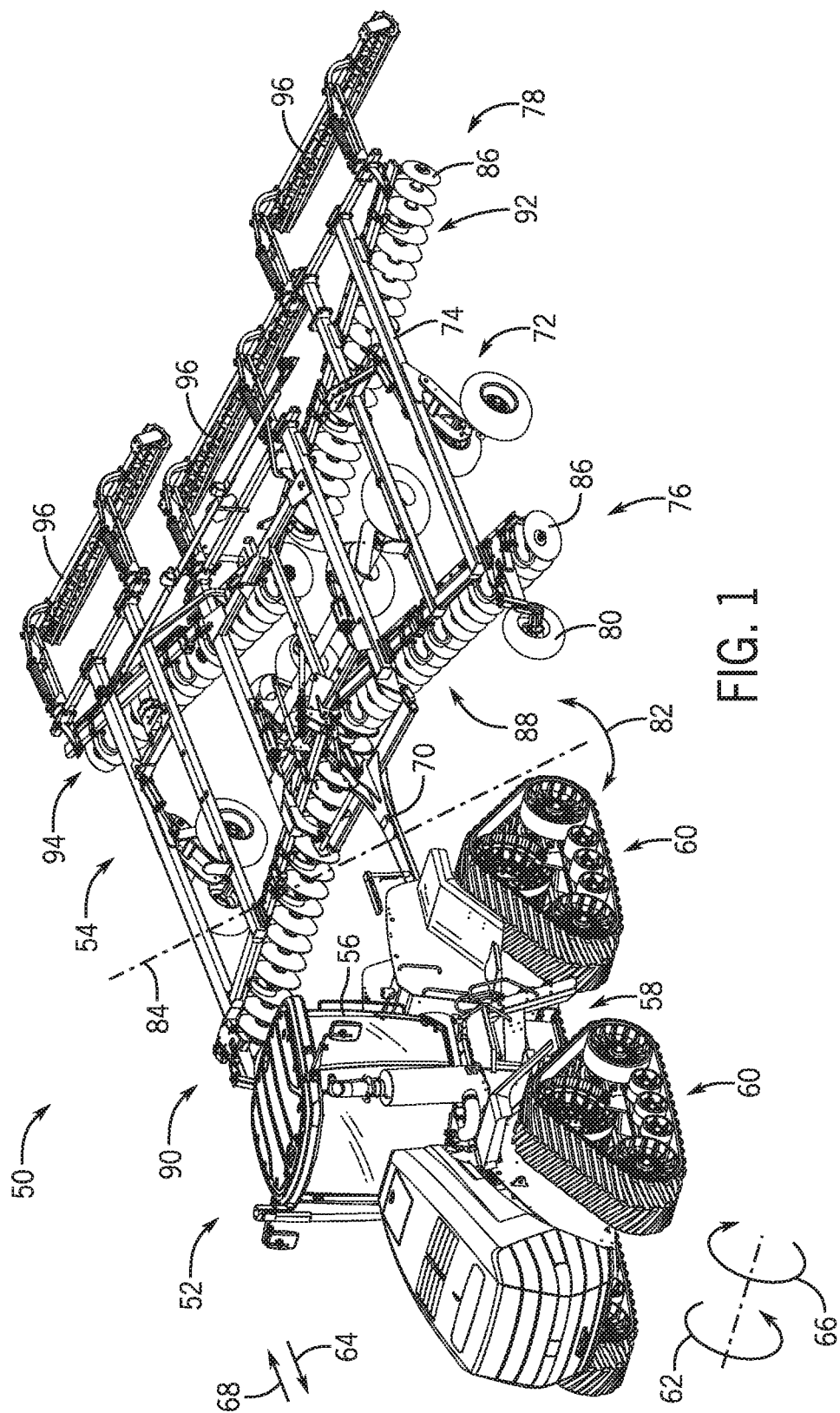
FIG. 1 is a perspective view of an embodiment of an agricultural system having a work vehicle and an agricultural implement, in accordance with an aspect of the present disclosure.

Turning to the drawings, FIG. 1 is a perspective view of an embodiment of an agricultural system 50 that includes a work vehicle 52 and an agricultural implement 54. In the illustrated embodiment, the work vehicle 52 is a tractor. However, in some embodiments, the work vehicle 52 may be an on-road truck, a harvester, and so forth that may be driven over a field, such as a farming field. As illustrated, the work vehicle 52 includes a cab 56 mounted on a chassis 58. The chassis 58 may support components, such as a motor, a hydraulic system (e.g., a pump, valves, a reservoir), an electrical system (e.g., a control system), a cooling system (e.g., an engine coolant system, a heating, ventilation, and/or air conditioning system), and the like to facilitate operation of the work vehicle 52. Additionally, the work vehicle 52 includes tracks and/or wheels 60 that operate to move the work vehicle 52. For example, the front and/or the rear tracks 60 may rotate in a first rotational direction 62 (e.g., a forward rotational direction) to drive the work vehicle 52 in a first direction 64 (e.g., a forward direction), and the front and/or rear tracks 60 may rotate in a second rotational direction 66 (e.g., reverse rotational direction), opposite the first rotational direction 62, to drive the work vehicle 52 in a second direction 68 (e.g., backward direction), opposite the first direction 64. The tracks 60 (e.g., the front tracks and/or the rear tracks) may be steered to turn the work vehicle 52.

The cab 56 is configured to house an operator of the work vehicle 52 during operation of the agricultural system 50. The cab 56 may provide access to various controls of the work vehicle 52. For example, the cab 56 may include a user interface to enable the operator to control the operation of certain systems of the work vehicle 52. In some embodiments, the cab 56 may include a component, such as a steering wheel, to enable the operator to steer the tracks 60 to turn the work vehicle 52. In additional or alternative embodiments, the cab may include other and/or additional types of user interfaces (e.g., a touch screen, a hand controller, a push button, a tracking pad) configured to receive user input or feedback to control various operations and systems of the work vehicle.

Moreover, the chassis 58 is coupled to the agricultural implement 54 to enable the work vehicle 52 to tow the agricultural implement 54. For example, the chassis 58 may be coupled to a hitch 70 of the agricultural implement 54 (e.g., via a corresponding hitch of the work vehicle). The agricultural implement 54 includes main wheels 72 that enable the agricultural implement 54 to move, such as over the field through which the work vehicle 52 is navigating. Thus, movement of the work vehicle 52 drives movement of the agricultural implement 54. For example, movement of the work vehicle 52 in the first direction 64 drives the agricultural implement 54 to move in the first direction 64, and movement of the work vehicle 52 in the second direction 68 drives the agricultural implement 54 to move in the second direction 68. In certain embodiments, the agricultural implement 54 may also be steerable. By way of example, the main wheels 72 may be turned to steer the agricultural implement 54.

In some embodiments, the agricultural implement 54 may be a tilling implement (e.g., vertical tilling implement) configured to break up soil within the field during operation of the agricultural system 50. The agricultural implement 54 includes a frame 74 to which the main wheels 72 are coupled. As illustrated in FIG. 1, the main wheels 72 are located between a first end 76 (e.g., front end) of the agricultural implement 54 and a second end 78 (e.g., rear end) of the agricultural implement 54. The agricultural implement 54 includes gauge wheels 80 that are coupled to the frame 74, such as at the first end 76. The gauge wheels 80 may be used to reduce an amount of lateral and/or vertical movement of the agricultural implement 54 while the agricultural system 50 is in operation. For example, the gauge wheels 80 may engage the soil surface while the work vehicle 52 tows the agricultural implement 54, such that movement of the agricultural implement 54 in yaw rotations 82 about a vertical axis 84 or movement of the agricultural implement 54 along the vertical axis 84 is limited or reduced.

The agricultural implement 54 also includes blades, discs, and/or shanks 86 that are coupled to the frame 74. In the illustrated embodiments, the blades 86 of the agricultural implement 54 are aligned in rows, including a first blade row 88, a second blade row 90, a third blade row 92, and a fourth blade row 94. The first blade row 88 and the second blade row 90 may each be positioned at the first end 76 of the agricultural implement 54, and the third blade row 92 and the fourth blade row 94 may each be positioned at the second end 78 of the agricultural implement 54. In some embodiments, the first blade row 88 may be positioned adjacent to and at an angle with respect to the second blade row 90, and the third blade row 92 may be positioned adjacent to and at an angle with respect to the fourth blade row 94. Thus, the blade rows 88, 90, 92, 94 may form an x-shaped configuration on the agricultural implement 54. In additional or alternative embodiments, the blades may be positioned in a different orientation on the agricultural implement (e.g., a k-shaped configuration, a diamond configuration, a parallel configuration) and/or the agricultural implement may include a different number of rows of blades.

During operation of the agricultural system 50, the blades 86 may engage soil of the field. For example, the main wheels 72 may be positioned to set the position of the frame 74 with respect to the soil surface. As the agricultural implement 54 is towed by the work vehicle 52, the blades 86 may rotate while engaged with the soil to till the soil. For instance, as the work vehicle 52 tows the agricultural implement 54 in the first direction 64 the blades 86 continue to engage the soil to till the soil. In some embodiments, the blades 86 may be concave or have certain surface features (e.g., flutes) that facilitate tilling of the soil. In additional or alternative embodiments, the agricultural implement 54 may include another suitable ground engaging tool, such as an opener disc, a cutter, a coulter, a chisel, and so forth.

The agricultural implement 54 may include basket assemblies 96, which may be disposed at the second end 78 of the agricultural implement 54. The basket assemblies 96 are configured to engage the soil surface during operation of the agricultural system 50. For example, as the work vehicle 52 tows the agricultural implement 54 in the first direction 64, each basket assembly 96 may provide a downward force on the soil and rotate to level the soil tilled by the blades 86 and/or the cut crop residue of the field. Although the agricultural implement 54 has three basket assemblies 96 in the illustrated embodiment, additional or alternative embodiments of the agricultural implement may have any suitable number of basket assemblies and/or any other suitable component(s) (e.g., tines) configured to level the soil during operation of the agricultural system. In some embodiments, the basket assemblies 96 may also stabilize the agricultural implement 54 during operation of the agricultural system 50. For example, the basket assemblies 96 may dampen vertical movement of the agricultural implement 54 by providing a downward pressure. It should be noted that the agricultural implement may have any alternate configuration, such as having no gauge wheels, no main wheels, no baskets, wheels instead of tracks on the work vehicle, any other suitable configuration, or any combination thereof. The agricultural implement may also be any other type of agricultural implement, such as a planting implement, a seeding implement, and so forth.

Figure 2:
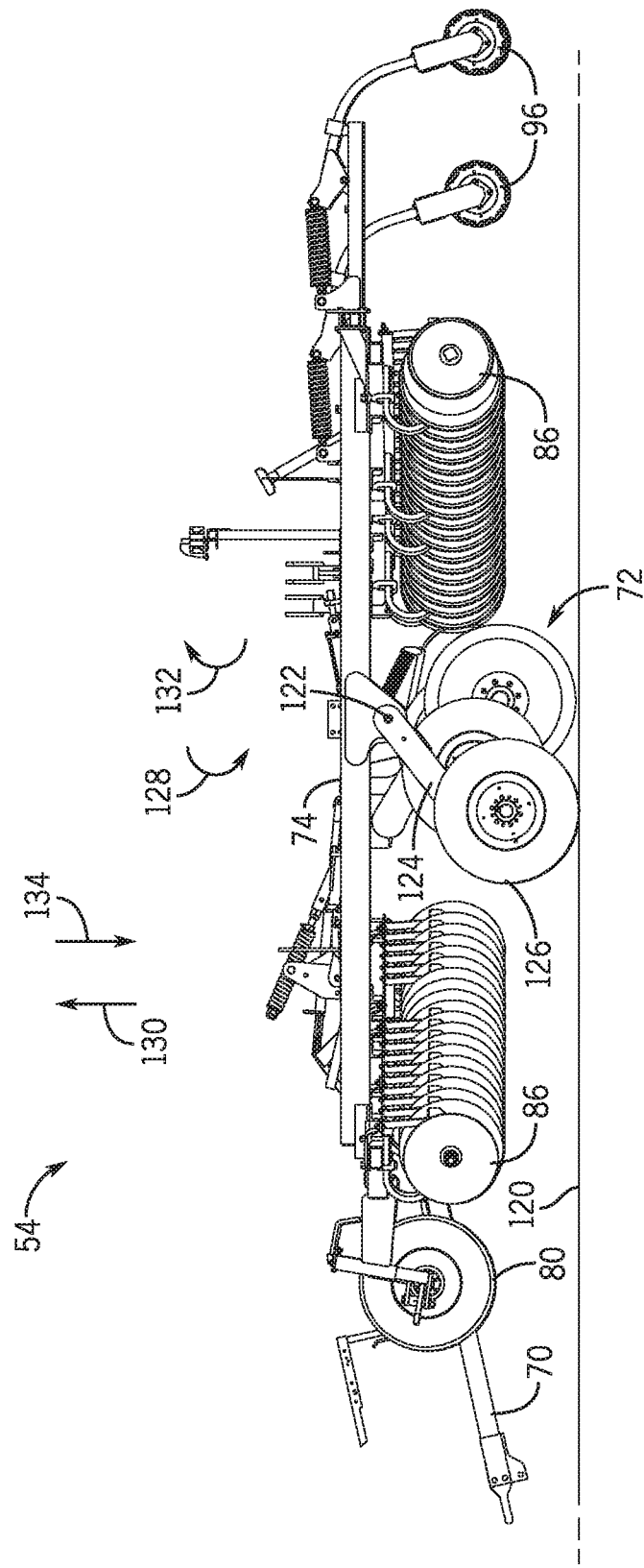
FIG. 2 is a side view of the agricultural implement of FIG. 1, in accordance with an aspect of the present disclosure.

FIG. 2 is a side view of the agricultural implement 54 of FIG. 1. In the illustrated implementation, certain main wheels 72 are engaging a soil surface 120. Each main wheel 72 is movably coupled to the frame 74, such as via a pivot 122. The pivot 122 enables each main wheel 72 to rotate relative to the frame 74. In some embodiments, each main wheel 72 is coupled to the pivot 122 by an arm 124. Although two main wheels 72 are coupled to each arm 124 in the illustrated embodiment, there may be any suitable number of main wheels 72 coupled to each arm 124. The arm 124 may rotate about the pivot 122 to rotate the main wheel 72. Rotation of the main wheels 72 may change a distance between the main wheels 72 and the frame 74 to change a height of the frame 74 relative to the soil surface 120. In the illustrated embodiment, each blade 86 is statically coupled to the frame 74 and may remain fixed relative to the frame 74, such that rotation of the main wheels 72 relative to the frame 74 changes the position of the blades 86 relative to the soil surface 120 (e.g., to engage or disengage the blades 86 from the soil). The main wheels may additionally or alternatively be movably coupled to the frame by other suitable mechanisms, such as via a piston configured to move the main wheels linearly relative to the frame.

Although the position of the agricultural implement 54 relative to the soil surface 120 is adjusted by controlling the position of the main wheels in the illustrated embodiment, it should be noted that in additional or alternative embodiments, the position of the blades may be adjusted in other manners. For example, the hitch may be raised and/or lowered relative to the soil surface (e.g., via adjustment of the hitch of the work vehicle) to adjust the position and/or a pitch of the agricultural implement, thereby adjusting the position of the blades relative to the soil surface. The agricultural implement may have no main wheels, fixed main wheels, or adjustable main wheels in addition to the adjustable hitch. In further embodiments, the blades may be directly adjustable relative to the soil surface. For example, individual blades or groups of blades may be adjustable via a subframe of the agricultural implement.

In one example, a particular main wheel 126 may rotate in a first rotational direction 128 to extend the particular main wheel 126 away from the frame 74, thereby raising the frame 74 relative to the soil surface 120 in an upward vertical direction 130. Additionally, the particular main wheel 126 may rotate in a second rotational direction 132 to retract the particular main wheel 126 closer to the frame 74, thereby lowering the frame 74 relative to the soil surface 120 in a downward vertical direction 134. In this manner, rotation of the particular main wheel 126 in the first rotational direction 128 moves the blades 86 in the upward vertical direction 130 to raise the blades 86 relative to the soil surface 120, and rotation of the particular main wheel 126 in the second rotational direction 132 moves the blades 86 in the downward vertical direction 134 to lower the blades 86 relative to the soil surface 120. Other main wheels of the agricultural implement may be moved via similar techniques, or may be moved in the opposite manner. That is, rotation of the main wheel in the first rotational direction may retract the main wheel, and rotation of the main wheel in the second rotational direction may extend the main wheel.

In certain implementations, the agricultural implement 54 may include a hydraulic system to rotate the respective arms 124. For example, hydraulic cylinders coupled to the arms 124 may extend or retract based on an amount of fluid directed through the hydraulic cylinders to rotate the arms 124 about the pivots 122. In additional or alternative embodiments, the agricultural implement may include another suitable system, such as an electromechanical system, to rotate the main wheels about the pivots. In further embodiments, the main wheels may move relative to the frame in an alternative manner, such as linearly extending and retracting, to adjust the position of the frame relative to the soil surface. In the illustrated embodiment, the frame 74 is in a raised position. However, the frame may be adjusted to other positions, such as a lowered position that engages the blades into the soil and/or an intermediate position partially engages the blades into the soil.

Figure 3:
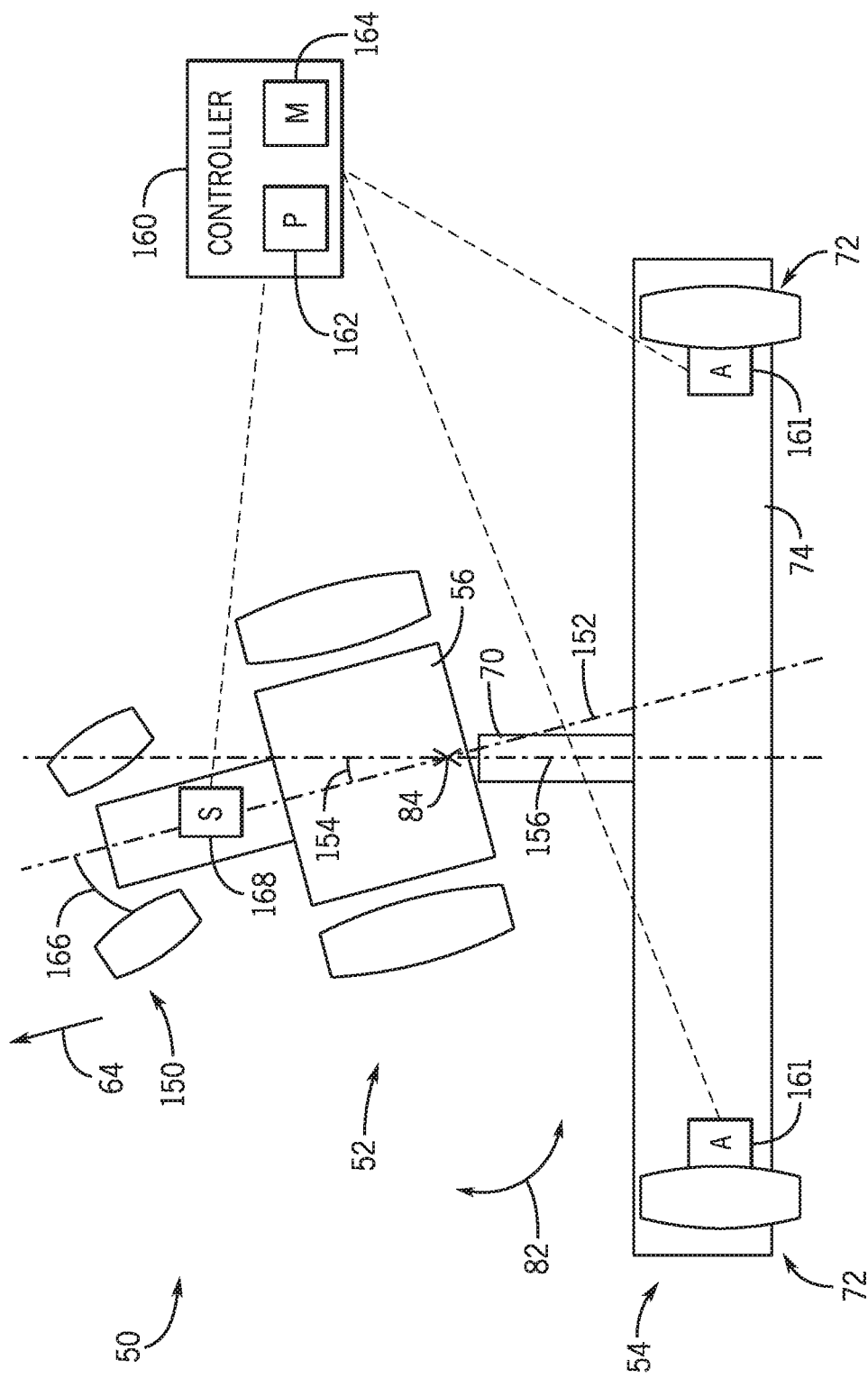
FIG. 3 is a top view of an embodiment of the agricultural system, in which the work vehicle is at an angle with respect to the agricultural implement, in accordance with an aspect of the present disclosure.

FIG. 3 is a top view of an embodiment of the agricultural system 50, in which the work vehicle 52 is at an angle with respect to the agricultural implement 54. The work vehicle 52 includes wheels 150 in the illustrated embodiment, in which the work vehicle 52 may be steered by turning the wheels 150. For example, the wheels 150 (e.g., front wheels) may be steered by the operator of the agricultural system 50, thereby angling the work vehicle 52 with respect to the hitch 70 of the agricultural implement 54. In alternative embodiments, the work vehicle may have tracks as shown in FIG. 1, and the work vehicle may be turned by articulating the chassis of the work vehicle, thereby angling the work vehicle with respect to the hitch. By turning the work vehicle, a first longitudinal axis 152 extending through the work vehicle 52 may be oriented at an angle 154 relative to a second longitudinal axis 156 extending through the agricultural implement 54. As mentioned, it may be difficult to position the ground engaging tools relative to the soil surface during a turn to engage the soil effectively. For example, if the ground engaging tools of the agricultural implement 54 are engaged with the soil while the agricultural implement 54 is turning (e.g., about the vertical axis 84), the ground engaging tools may experience excessive force imparted by the soil. However, if the ground engaging tools are positioned such that the ground engaging tools are disengaged from the soil, the ground engaging tools may not engage the soil effectively (e.g., to till the soil).

The agricultural system 50 includes a controller 160 configured to adjust the position of the ground engaging tools relative to the soil surface to relieve or limit the pressure placed on the ground engaging tools of the agricultural implement 54, while enabling the ground engaging tools to engage the soil surface effectively (e.g., partially engage the soil). The controller 160 may output a control signal to move the ground engaging tool relative to the soil surface based on a turning angle of the work vehicle. For example, at certain turning angles, the controller 160 may instruct actuators 161 to move the ground engaging tools to intermediate positions that partially engage the ground engaging tools with the soil surface. The controller 160 may be located in any suitable location, such as on the work vehicle 52 (e.g., in the cab 56), on the agricultural implement 54, or at a remote location. In some embodiments, the controller 160 includes a processor 162 configured to execute software code or instructions stored on a memory 164. The term "code" or "software code" used herein refers to any instructions or set of instructions that influence the operation of the controller. The code or software code may exist in a computer-executable form, such as machine code, which is the set of instructions and data directly executed by the controller, a human-understandable form, such as source code, which may be compiled in order to be executed by the controller, or an intermediate form, such as object code, which is produced by a compiler. As used herein, the term "code" or "software code" also includes any human-understandable computer instructions or set of instructions, e.g., a script, that may be executed on the fly with the aid of an interpreter executed by the controller.

As an example, the memory 164 may store processor-executable software code or instructions (e.g., firmware or software), which are tangibly stored on a tangible computer readable medium. Additionally or alternatively, the memory may store data (e.g., a table corresponding steering angles to positions of the ground engaging tools). As an example, the memory 164 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 162 may include multiple microprocessors, one or more "general-purpose" microprocessors, one or more special-purpose microprocessors, and/or one or more application specific integrated circuits (ASICS), or some combination thereof. For example, the processor 162 may include one or more reduced instruction set (RISC) or complex instruction set (CISC) processors.

The controller 160 may be configured to output a control signal to control a position of the ground engaging tools of the agricultural implement 54 based on a parameter indicative of a steering angle 166 of the work vehicle 52. As described herein, the steering angle 166 is an angle between at least one of the wheels 150 and the first longitudinal axis 152. In additional or alternative embodiments, if the agricultural implement 54 is steerable, the controller 160 may also control the position of the ground engaging tools based on a steering angle of the agricultural implement 54 (e.g., an angle between one of the main wheels 72 and the second longitudinal axis 156). The controller 160 may be communicatively coupled to a sensor 168 configured to monitor a parameter indicative of the steering angle 166. In some embodiments, the sensor 168 may be configured to output a sensor signal indicative of an orientation of the wheels 150 relative to the first longitudinal axis 152 to enable the controller 160 to determine the steering angle 166. In additional or alternative embodiments, the sensor may be configured to output a sensor signal indicative of another parameter, such as an orientation (e.g., an amount rotated) of a steering wheel in the cab, the angle 154 between the first longitudinal axis 152 and the second longitudinal axis 156, a force exerted on the blades of the agricultural implement, another suitable parameter, or any combination thereof. The controller 160 may receive the sensor signal indicative of the parameter from the sensor 168 and, in response, outputs a control signal to control the position of the ground engaging tools.

For example, the controller 160 may output a control signal to raise a height of the frame of the agricultural implement 54 along the vertical axis 84 in response to receiving the parameter sensor signal indicative of a greater steering angle 166. When the frame 74 is at a more elevated height relative to the soil surface, a greater surface area or volume of the ground engaging tools of the agricultural implement 54 may be exposed above the soil. In other words, a smaller portion of the ground engaging tools of the agricultural implement 54 may be in contact with the soil. For this reason, as the agricultural implement 54 turns, less force is exerted onto the ground engaging tools by the soil. As such, raising the frame 74 to a more elevated height above the soil surface may enable the agricultural implement 54 to engage the soil while increasing a longevity of the ground engaging tools.

In some embodiments, the controller 160 may output the control signal to the actuators 161 of the agricultural implement 54 to control the height of the frame 74 based on the feedback received from the sensor 168, which is indicative of the steering angle. By way of example, the controller 160 may be communicatively coupled to actuators 161 that are configured to move the main wheels 72. Based on feedback from the sensor 168 indicative of the steering angle 166, the controller 160 may control the actuators 161 to adjust the position of each main wheel 72 to raise or lower the height of the frame 74 relative to the soil surface, thereby moving the ground engaging tools relative to the soil surface. For instance, if the steering angle 166 is above a threshold angle, the controller 160 may control the actuators 161 to move the frame 74 to a raised position. In the raised position, less pressure is exerted onto the ground engaging tools as the agricultural implement 54 is turned. Additionally, if the steering angle 166 is below the threshold angle, the controller 160 may control the actuators 161 to move the frame 74 to a lowered position that is below the raised position. In the lowered position, the ground engaging tools may be inserted further into the soil to enable greater tilling of the soil.

In additional or alternative embodiments, the controller may output a notification (e.g., to a user interface) indicative of instructions to inform the operator of the agricultural system to adjust the position of the ground engaging tools. As an example, the controller may output a signal indicative of instructions to display a notification on the user interface of the cab. The notification may indicate a particular steering angle determined by the controller and/or a particular position to which the operator may set the position of the ground engaging tools based on the determined steering angle. Based on the notification, the operator may manually adjust the position of the ground engaging tools, such as via the controls in the cab 56.

The controller 160 may be configured to control the position of the ground engaging tools dynamically. For example, the steering angle 166 may continuously change as the work vehicle 52 is turning. As a result, the controller 160 may continuously or periodically control the position of the ground engaging tools while the work vehicle 52 turns. For instance, the operator of the work vehicle 52 may initially begin a turn at a first steering angle, and the controller 160 may control the actuators 161 to move the frame 74 of the agricultural implement 54 to a first position. Before the turn is completed, the operator of the work vehicle 52 may increase the steering angle 166 to a second steering angle, and the controller 160 may control the actuators 161 to move the frame 74 of the agricultural implement 54 to a second position that is at a greater height relative to the soil surface, as compared to the first position. After the turn is completed, operator of the work vehicle 52 may slowly decrease the steering angle 166 to zero. As the steering angle 166 decreases, the controller 160 may correspondingly control the actuators 161 to lower the frame 74 of the agricultural implement 54.

Figure 4:
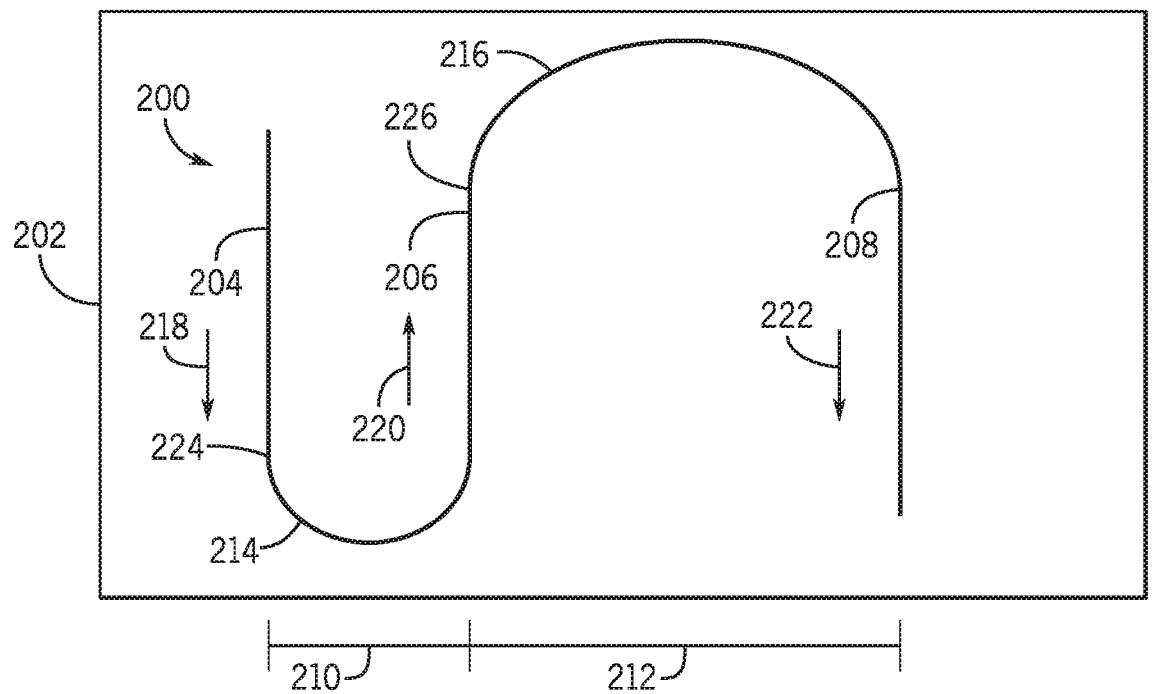
FIG. 4 is a top view of an embodiment of a path that the agricultural system may navigate during operation of the agricultural system, in accordance with an aspect of the present disclosure.

FIG. 4 is a top view of an embodiment of a path 200 that the agricultural system may navigate during operation of the agricultural system. The path 200 may indicate a route to be traveled by the work vehicle through a field 202 during a tilling operation. For example, the path 200 may be programmed within the controller communicatively coupled to the work vehicle, and the controller may automatically control the work vehicle to navigate the field 202 based on the path 200. For instance, based on the path 200, the controller may control a speed of movement of the work vehicle, the steering angle of the work vehicle, and so forth, to guide the work vehicle to travel through the field 202 along a route set by the path 200.

In the illustrated embodiment, the path 200 includes a first row 204, a second row 206, and a third row 208. Each row 204, 206, 208 may be generally straight and may be oriented generally parallel to one another. In the illustrated path, a first distance 210 between the first row 204 and the second row 206 may be substantially shorter than a second distance 212 between the second row 206 and the third row 208. As an example, there may be an obstacle between the second row 206 and the third row 208 that the work vehicle may navigate around to reach the third row 208. The path 200 also includes a first curve 214 connecting the first row 204 with the second row 206, and the path 200 includes a second curve 216 connecting the second row 206 with the third row 208. Thus, by following the path 200, the work vehicle may travel along the first row 204 in a first direction 218 and along the first curve 214 to reach and travel along the second row 206 in a second direction 220. The work vehicle may then travel along the second curve 216 to reach and travel along the third row 208 in a third direction 222.

The controller may be configured to control the position of the ground engaging tools of the agricultural implement based on the path 200, such as based on the steering angle at each location along the path 200. Accordingly, the controller may control the height of the ground engaging tools relative to the soil surface based on the shape or profile of the path 200. For example, at a first point 224, the steering angle increases from zero to a turning angle, and the controller may identify a first steering angle associated with the first point 224 to transition the work vehicle from the first row 204 to the first curve 214. In other words, the controller may identify the first steering angle associated with the first curve 214 of the path 200, and may control the position of the ground engaging tools at the first point 224 in anticipation of the first steering angle, such that the height of the ground engaging tool is set when the agricultural implement reaches the first curve 214.

Additionally, the controller may identify a second point 226 at which a second steering angle is established to transition from the second row 206 to the second curve 216. The controller may then control the position of the ground engaging tool at the second point 226 in anticipation of the second steering angle. Based on the shape of the path 200, the controller may determine the associated steering angle to cause the work vehicle to follow the path 200. In other words, the controller may determine the first steering angle based on the shape of the first row 204 and/or the first curve 214. Furthermore, the controller may determine the second steering angle based on the shape of the second row 206 and/or the second curve 216. In the example embodiment, the first distance 210 is substantially smaller than the second distance 212. As such, the work vehicle has a greater steering angle while navigating the first curve 214 than while navigating the second curve 216. Accordingly, the first steering angle is greater than the second steering angle. Thus, during operation of work vehicle 52 along the path 200, the controller may set the position of the ground engaging tools at a greater height at the first point 224, as compared to at the second point 226. In this manner, the controller may use the path 200 in addition or as an alternative to the sensor to determine how the ground engaging tools are to be positioned relative to the soil surface, such as based on identified steering angles associated with the profile or shape of the path 200.

FIG. 5 is a graph of an embodiment of a steering profile 250 that may be used by the agricultural system to control the position of the ground engaging tools based on the steering angle. The steering profile 250 relates the height of the ground engaging tools (e.g., via the controller) with the determined steering angle. The controller may determine the steering angle and then sets the height of the ground engaging tools, or the controller sets the height of the ground engaging tools based on a signal indicative of the steering angle. In the illustrated embodiment, the steering profile 250 is a step profile, in which the position of the ground engaging tools is set to and maintained at a respective height at different ranges of the steering angle. As described with reference to FIG. 5, the height of the ground engaging tools refers to an adjustment of the height above a reference height, such as selected by the operator of the agricultural system. For example, the operator of the agricultural system may select a reference height (e.g., a target penetration depth for effective agricultural operations) at which the ground engaging tools are set during operation of the agricultural system to till soil while the steering angle is substantially zero (i.e., while the agricultural system is not turning). A height of 0 on the steering profile 250 indicates that the height of the ground engaging tools is at the reference height, and the position of the ground engaging tools is maintained at the reference height. A height of the ground engaging tools above 0 on the steering profile 250 indicates that the position of the ground engaging tools is raised above the reference height. Moreover, with reference to FIG. 5, the steering angle is the absolute value of the steering angle 166 of FIG. 3. That is, for example, the steering profile 250 may indicate the same height for a steering angle of 25 degrees and a steering angle of −25 degrees, which has the same absolute value of the steering angle of 25 degrees.

In the illustrated steering profile 250, the height of the ground engaging tools is at a first height 252 while the steering angle is between 0 degrees and a first steering angle 254. For example, the first height 252 may be approximately 0, indicating a deadband region in which the height of the ground engaging tools is not changed from the reference height until the steering angle exceeds the absolute value of the first steering angle 254. As an example, the first steering angle 254 may be an angle between 5 degrees and 20 degrees. Thus, the height of the ground engaging tools may remain at approximately the reference height while the steering angle is between −10 degrees and 10 degrees.

If the steering angle exceeds the absolute value of the first steering angle 254, the height of the ground engaging tools may be adjusted to a second height 256 that is greater than the first height 252. For example, the second height 256 may be a height between one inch to ten inches greater than the first height 252. Accordingly, the ground engaging tools are raised and maintained at a position that is one to ten inches above the first height 252 (e.g., a reference height) while the steering angle is greater than the first steering angle 254. In certain embodiments, at least a portion of some of the ground engaging tools of the agricultural implement may engage the soil while the ground engaging tools are at the second height 256. However, a smaller surface area or volume of the ground engaging tools may be inserted into the soil at the second height 256 as compared to the first height 252. Thus, while the ground engaging tools are at the second height 256, the agricultural implement may at least partially till some of the soil, but less force may be imparted onto the ground engaging tools by the soil as the agricultural implement turns.

Furthermore, if the steering angle exceeds the absolute value of a second steering angle 258, the height of the ground engaging tools may be set to a third height 260 that is greater than the first height 252 and the second height 256. The height of the ground engaging tools remains at the second height 256 so long as the steering angle is between the first steering angle 254 and the second steering angle 258. If the steering angle falls below the first steering angle 254, the ground engaging tools are lowered to the first height 252. If the steering angle exceeds the second steering angle 258, the ground engaging tools may be raised to the third height 260. As long as the steering angle exceeds the second steering angle 258, the height of the ground engaging tools may be maintained at the third height 260. If the steering angle falls below the second steering angle 258, the height of the ground engaging tools may be lowered to the second height 256. In some embodiments, the second steering angle 258 may be an angle between 20 degrees and 50 degrees, between 30 and 60 degrees, or greater than 60 degrees. Additionally, the third height 260 may be a height that raises the ground engaging tools of the agricultural implement to clear the soil. That is, the ground engaging tools may be fully raised at the third height 260, such that the ground engaging tools are no longer engaging the soil. As such, as the agricultural implement turns when the steering angle is greater than the second steering angle 258, no force is exerted onto the ground engaging tools by the soil.

The steering profile may include additional or alternative relationships between the steering angle and the height of the ground engaging tools. For example, the steering profile may have additional angle ranges and corresponding heights to which the ground engaging tools may be set. Further, although FIG. 5 illustrates that the ground engaging tool is positioned at the same respective height at the different steering angles, the ground engaging tools may alternatively be positioned at different heights for a particular steering angle. That is, for instance, at the first steering angle, the ground engaging tools may be positioned at the second height in a first condition. However, in a second condition (e.g., the ground engaging tools are offset, the soil is at a different hardness), at the first steering angle, the ground engaging tools may be positioned at a height that is different than the second height depicted in FIG. 5. Moreover, an alternative steering profile may have a different shape than the illustrated steering profile. By way of example, another steering profile may be a continuous profile, rather than a step profile. That is, a position of the ground engaging tools may be set for each steering angle, rather at different ranges of steering angles. For example, the continuous profile may have a linear shape (e.g., the steering angle and the height are proportional to one another), an exponential shape, and the like. In further embodiments of the steering profile, the position of the ground engaging tools may be determined by an equation or algorithm that utilizes the steering angle to determine the tool height. Thus, each steering angle may correspond to a determined height of the ground engaging tools.

In addition, the rate at which the height of the ground engaging tools is adjusted may be based on the steering angle. In one example embodiment, a steering profile may relate the rate at which the ground engaging tools are adjusted with the steering angle. For instance, the height of the ground engaging tools may be adjusted at a quicker rate when the steering angle is greater, such that the ground engaging tools may raise more quickly at greater steering angles. In another example embodiment, a steering profile may relate the rate at which the height of ground engaging tools is adjusted with a current height of the ground engaging tools. For example, if the determined target height of the ground engaging tools (e.g., based on the steering angle) is substantially different than the current height of the ground engaging tools, the ground engaging tools may be adjusted at a quicker rate, as compared to if the determined target height of the ground engaging tools is merely slightly different than the current height of the ground engaging tools.

In some embodiments, different candidate steering profiles may be employed by the controller. As an example, the controller of the agricultural system may be configured to store multiple different candidate steering profiles that are selectable by the operator. The operator may select a first steering profile to be used by the controller during a first operation. The operator may select a second, different steering profile to be used by the controller during a second operation. In additional or alternative embodiments, each steering profile may be determined based on a parameter of the work vehicle and/or agricultural implement. For instance, the operator may input information (e.g., dimension, implement type, operating condition, operating parameter) associated with the work vehicle and/or agricultural implement of the agricultural system. The controller 160 may then automatically select a suitable steering profile based on the input information. In further embodiments, the operator may modify the candidate steering profiles, such as to adjust the relationship between the steering angle and the height of the ground engaging tools. For example, the operator may modify the steering angles at which the height of the ground engaging tools change, and/or may modify the heights at which the ground engaging tools may be set based on the steering angle.

In certain embodiments, different candidate steering profiles may have different rates at which the agricultural implement is adjusted and/or different heights to which the ground engaging tools are positioned. By way of example, an aggressive steering profile may generally cause the height of ground engaging tools to adjust more quickly than a mild steering profile and/or may generally cause the ground engaging tools to engage the soil at a greater depth than the mild steering profile. Based on a desired farming operation, the operator may select whether to use the aggressive steering profile or the mild steering profile to operate the agricultural implement to farm the field. For example, the operator may select the aggressive steering profile for a field with softer soil to enable the ground engaging tools to till the soil more effectively, and the operator may select the mild steering profile for a field with tougher soil to increase the longevity of the ground engaging tools.

FIG. 6 is a flowchart of an embodiment of a method 280 for controlling the position of the ground engaging tools based on the steering angle. For example, the controller may perform the steps of the method 280. In some embodiments, additional steps may be performed, or certain steps of the method may be modified, removed, and/or performed in a different order, such as for different types of agricultural systems.

At block 282, the controller is configured to determine the steering angle of the work vehicle. For example, the controller may receive feedback from a sensor (e.g., the sensor 168 of FIG. 3) indicative of the steering angle. In additional or alternative embodiments, the controller may determine the steering angle based on another parameter. As an example, the controller may use a route, such as the path 200 of FIG. 4, to determine an associated steering angle. That is, the controller may determine the steering angle based on a shape and/or a geometry of the path (e.g., the shape of the first curve 214 of FIG. 4). In further embodiments, the controller may determine the steering angle based on an associated parameter of the agricultural system, such as an orientation between the work vehicle and the agricultural implement.

At block 284, the controller is configured to determine a target height of the ground engaging tools based on the steering angle. In some embodiments, the controller may compare the steering angle with the steering profile to determine a corresponding position of the ground engaging tools. For instance, in the embodiment of the steering profile 250 of FIG. 5, the controller may identify the target height of the ground engaging tools on the steering profile 250 corresponding to the determined steering angle. In additional or alternative embodiments, the controller may use the determined steering angle in an equation or algorithm to determine the corresponding target height of the ground engaging tools. If the agricultural implement is steerable, the controller may also determine the target height of the ground engaging tools based on the steering angle of the agricultural implement.

At block 286, the controller may output a control signal to adjust the position of the ground engaging tools based on the determined target height. In certain circumstances, the target height may not be different than the current height of the ground engaging tools. Therefore, the position of the ground engaging tools may not be adjusted relative to the soil surface. In some circumstances, the target height may be different than the current height of the ground engaging tools. As a result, in some embodiments, the controller may instruct the actuators to adjust the position of the ground engaging tools relative to the soil surface. For example, the controller may instruct actuators (e.g., actuators 161 of FIG. 3) to move the main wheels relative to the frame to move the frame relative to the soil surface. Additionally or alternatively, the controller may notify the operator of the agricultural system that the position of the ground engaging tools is to be moved based on the determined steering angle. Thus, the operator may manually control the agricultural system to move the ground engaging tools. For example, the control signal may indicate (e.g., on the user interface in the cab) a suggested target position to which the operator may move the ground engaging tools, such that the operator may adjust the ground engaging tools toward the target position.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system comprising:
a controller comprising a memory and a processor, wherein the controller is configured to:
determine a steering angle of a work vehicle of the agricultural system;
determine a target height of a ground engaging tool of the agricultural system based on the steering angle;
output a signal to control a height of the ground engaging tool relative to a soil surface based on the target height;
output a first signal to set the ground engaging tool to a first target height associated with a first steering angle; and
output a second signal to set the ground engaging tool to a second target height associated with a second steering angle, the first target height is greater than the second target height, and the first steering angle is greater than the second steering angle.

2. The agricultural system of claim 1, comprising an implement that comprises the ground engaging tool.

3. The agricultural system of claim 2, wherein the implement comprises a frame and a wheel, wherein the wheel is movable relative to the frame, and the signal is configured to control the wheel relative to the frame to control the height of the ground engaging tool relative to the soil surface.

4. The agricultural system of claim 3, wherein the implement comprises a hydraulic system, an electromechanical system, or any combination thereof, configured to adjust the wheel relative to the frame.

5. The agricultural system of claim 3, wherein the ground engaging tool comprises a blade configured to engage soil, and the blade is statically coupled to the frame, such that controlling the height of the ground engaging tool adjusts a position of the blade.

6. The agricultural system of claim 2, comprising a work vehicle, wherein the implement is attached to the work vehicle such that the work vehicle tows the implement during operation of the agricultural system.

7. At least one non-transitory computer readable medium comprising executable instructions that, when executed by a processor, are configured to cause the processor to:
  determine a steering angle of a work vehicle of an agricultural system;
  determine a target height of a ground engaging tool of the agricultural system based on the steering angle;
  output a signal to control a height of the ground engaging tool relative to a soil surface based on the target height;
  output a first signal to set the ground engaging tool to a first target height associated with a first steering angle; and
  output a second signal to set the ground engaging tool to a second target height associated with a second steering angle, the first target height is greater than the second target height, and the first steering angle is greater than the second steering angle.

8. The at least one non-transitory computer readable medium of claim 7, wherein the signal is configured to cause the processor to maintain the height of the ground engaging tool while the steering angle is below a threshold angle.

9. The at least one non-transitory computer readable medium of claim 8, wherein the threshold angle has a range of steering angles between 0 degrees and 10 degrees.

10. The at least one non-transitory computer readable medium of claim 7, wherein the signal is output to an actuator of the agricultural system and is indicative of instructions to move the ground engaging tool relative to the soil surface.

11. The at least one non-transitory computer readable medium of claim 10, wherein the actuator is disposed on an implement configured to couple to the work vehicle, the ground engaging tool is coupled to a frame of the implement, and the actuator is configured to move a wheel of the implement with respect to the frame of the implement to move the ground engaging tool relative to the soil surface.

12. The at least one non-transitory computer readable medium of claim 7, wherein the executable instructions are configured to cause the processor to output an additional signal to adjust the ground engaging tool to the target height at a particular rate based on the steering angle.

13. The at least one non-transitory computer readable medium of claim 7, wherein the executable instructions are configured to cause the processor to determine the target height of the ground engaging tool by comparing the steering angle with a steering profile.

14. The at least one non-transitory computer readable medium of claim 7, wherein the executable instructions are configured to cause the processor to determine the steering angle based on feedback from a sensor disposed on the agricultural system, based on a programmed route, or any combination thereof.

* * * * *